(12) United States Patent
Dziecielewski

(10) Patent No.: US 9,392,279 B2
(45) Date of Patent: Jul. 12, 2016

(54) METHOD AND SYSTEM FOR GENERATING AN INSTANTANEOUS DECODING REFRESH (IDR) PICTURE SLICE IN AN H.264/AVC COMPLIANT VIDEO DATA STREAM

(71) Applicant: Advanced Digital Broadcast S.A., Chambesy (CH)

(72) Inventor: Tomasz Dziecielewski, Zielona Gora (PL)

(73) Assignee: ADVANCED DIGITAL BROADCAST S.A., Chambesy (CH)

( * ) Notice: Subject to any disclaimer, the term of this patent is extended or adjusted under 35 U.S.C. 154(b) by 479 days.

(21) Appl. No.: 14/029,823

(22) Filed: Sep. 18, 2013

(65) Prior Publication Data
US 2014/0086326 A1 Mar. 27, 2014

(51) Int. Cl.
*H04N 7/36* (2006.01)
*H04N 19/51* (2014.01)
*H04N 21/4402* (2011.01)
*H04N 19/70* (2014.01)
*H04N 19/513* (2014.01)
*H04N 19/48* (2014.01)
*H04N 19/40* (2014.01)

(52) U.S. Cl.
CPC ......... *H04N 19/00684* (2013.01); *H04N 19/40* (2014.11); *H04N 19/48* (2014.11); *H04N 19/513* (2014.11); *H04N 19/70* (2014.11); *H04N 21/4402* (2013.01)

(58) Field of Classification Search
CPC .......... H04N 19/00764; H04N 19/008; H04N 19/105; H04N 19/44
See application file for complete search history.

(56) References Cited

U.S. PATENT DOCUMENTS

| 8,731,065 B2 * | 5/2014 | Moriyoshi | G11B 27/007 375/240.25 |
| 2012/0062756 A1 * | 3/2012 | Tian | H04N 19/008 348/218.1 |

FOREIGN PATENT DOCUMENTS

EP 2249567 11/2010

* cited by examiner

*Primary Examiner* — Huy T Nguyen
(74) *Attorney, Agent, or Firm* — Mark M. Friedman

(57) ABSTRACT

Method for generating an IDR picture slice in an H.264/AVC stream, the method including finding an I-type picture and identifying it as a start picture, modifying and/or adding, in each slice header of the start picture, IDR-specific elements, removing, from each slice header of the start picture, non-IDR-specific elements, removing all reference and non-reference B-slices between the start picture and the next I-picture or P-picture, following the start picture, that is a frame or the first field, in decoding order, of a complementary field pair. Starting from the first picture after the removed slices, for each slice header executing: correcting frame_num so that they are valid with reference to the previous picture, correcting references, in the MMCO, as a function of the removed reference B-pictures, correcting references, found in the "Reference picture list reordering" structure, as a function of the removed reference B-pictures and restoring slice encapsulation for modified slices.

14 Claims, 8 Drawing Sheets

501

502 — I  B  B  B  B  B  B  B  P  B 34 35 36 37 38 39 40 40 40 41
503 (original frame_num)

0  1  2  3  4  5  5  5  5  5
504 (number_of_dropped_reference_frames)

34 35 36 37 38 39 39 39 39 39
505 (frame_num_offset)

0  -  -  -  -  -  -  -  1  2
506 (new frame_num)

0  -  -  -  -  -  -  -  1  2
   (new POC)

Fig. 5

METHOD AND SYSTEM FOR GENERATING AN INSTANTANEOUS DECODING REFRESH (IDR) PICTURE SLICE IN AN H.264/AVC COMPLIANT VIDEO DATA STREAM

The present invention relates to a method and system for generating an Instantaneous Decoding Refresh (IDR) picture slice in a previously encoded H.264/AVC compliant video data stream.

Digital video streams consist of a plurality of video frames that shall be displayed in a sequence. The higher quality of the video streams, the greater the size, in bytes, of the corresponding stream.

In order to reduce required transmission bandwidth or required storage space, it is well known to compress video streams according to different compression standards. Presently H.264/AVC is one of the most efficient and widely used video compression standard.

Most modern video encoding standards, H.264/AVC amongst them, employ three different compression algorithms for compressing video pictures: I or IDR pictures, which do not need other pictures to be decoded (intracoded pictures), P pictures, which need a single preceding picture (in decoding order) to be decoded (intercoded pictures), and B pictures, which may need an additional picture to be decoded (intercoded pictures).

For example, MPEG-2 video streams comprise sequences of I, P and B frames. Length of a video sequence depends on the content of the video stream and can be up to several hundred MBs.

In turn, more recent H.264/AVC design covers a Video Coding Layer (VCL), which efficiently represents the video content, and a Network Abstraction Layer (NAL), which formats the VCL representation of the video and provides header information in a manner appropriate for conveyance by particular transport layers or storage media. AVC and H.264 are synonymous names. The standard is known by the full names "ISO/IEC 14496-10" and "ITU-T Recommendation H.264".

A coded video sequence consists of a series of access units that are sequential in the NAL unit stream and use only one sequence parameter set. Each coded video sequence can be decoded independently of any other coded video sequence, given the necessary parameter set information, which may be conveyed "in-band" or "out-of-band". At the beginning of a coded video sequence is an instantaneous decoding refresh access unit. An IDR access unit contains an intra picture.

A coded video sequence in H.264/AVC consists of a sequence of coded pictures. A coded picture can represent either an entire frame or a single field, as was also the case for MPEG-2 video.

The H.264/AVC operate on entities called slices, which are a sequence of macroblocks which are processed in the order of a raster scan when not using FMO (Flexible Macroblock Ordering). A picture may be split into one or several slices. A picture is therefore a collection of one or more slices in H.264/AVC. Slices are self-contained in the sense that given the active sequence and picture parameter sets, their syntax elements can be parsed from the bitstream and the values of the samples in the area of the picture that the slice represents can be correctly decoded without use of data from other slices provided that utilized reference pictures are identical at encoder and decoder.

In H.264/AVC, both B and P pictures can use multiple reference pictures with the distinction between both of these picture types being that B pictures allow the use of inter prediction with at most two motion-compensated prediction signals per block, while P picture allow the use of only one predictor per predicted block. Both P and B pictures can be used for reference by subsequent pictures, a feature that allows for employing highly efficient encoding schemes such as widely adopted hierarchical B-picture encoding. Whether a slice is a reference or non-reference slice is determined by a field nal_ref_idc transmitted in NAL header.

An exemplary sequence of H.264/AVC involving hierarchical B pictures has been depicted in FIG. 1. The sequence comprises I picture 104 followed by B pictures 102, 103 and a P picture 105. Pictures B and P reference other pictures 101. For example picture (B3) 103 is a non-reference B picture that is not referenced by any other pictures. The same picture may reference pictures (I0) 104, (B2) 102 and, climbing up the hierarchy, pictures (B1) 108 and (P0) 105. Reference B picture (B2) 102 in turn is both referenced by other pictures and does comprise a reference to other picture.

In order to ensure reference picture availability during decoding, coding order 107 must be different than display order 106. Therefore, at the time of encoding, the encoder sets valid identification of slices of pictures including, for example, parameters such as frame_num or picture_order_count. The aforementioned parameters are obtained from each slice header.

In addition to typical I, P and B MPEG frames/pictures, H.264/AVC introduces an IDR picture. An encoder sends an IDR (Instantaneous Decoder Refresh) coded picture to clear the contents of the reference picture buffer. On receiving an IDR coded picture, the decoder marks all pictures in the reference buffer as 'unused for reference'. All subsequent transmitted slices can be decoded without reference to any frame decoded prior to the IDR picture. The first picture in a coded video sequence is always an IDR picture.

However, the H.264/AVC standard does not require repetition of IDR frames in a stream. Hence, upon starting playback of a recorder stream from an arbitrary location or upon tuning to a live stream the decoder may not receive an IDR frame at all. In fact, currently, television broadcasters often do not use IDR frame(s). This is because non-IDR intra pictures with additional constraints are usually sufficient and the frequent insertion of IDR pictures decreases the coding efficiency for high-delay prediction structures.

On the other hand some devices require that an IDR frame is present in a received stream. For example such device is a very popular Pad™ that is a tablet computer capable of decoding only H.264/AVC content that comprises IDR frame(s) according to the standard.

Prior art method disclosed in US20120207454 entitled "STREAMING SERVICE AND PLAYBACK DEVICE USING SVC SERVER" assumes an IDR frame will be present in the source stream. The method is based on such assumption and does not address a situation when an IDR is not received. The conversion module may extract, from the H.264 NAL stream, at least one piece of information between a previous reference (P) picture and an instantaneous decoding refresh (IDR) picture, generate a start code, that is a sequence parameter set (SPS), and a picture parameter set (PPS), using the at least one piece of extracted information, insert the start code into the H.264 NAL to construct the RTSP stream, and provide the constructed RTSP stream to the streaming server. In '454, the IDR picture may correspond to a head picture of an image sequence, the SPS may correspond to information associated with modulation of an overall sequence such as a profile, a level, and the like, and the PPS may correspond to an encoding code of an overall picture.

This in turn usually results in that already encoded H.264/AVC streams that do not comprise IDR frame(s) are transcoded in order to obtain an output stream that would satisfy the criterion of having at least one IDR frame at the beginning of the output stream.

Transcoding however, is usually beyond capabilities of typical end-user equipment such as a television-set, a set-top-box or a smartphone, especially in case when real time transcoding would be considered.

Therefore there exists a need of efficient and improved method of generating an IDR-compliant H.264/AVC stream from an already encoded H.264/AVC stream without a need of transcoding, which in particular means that the data of video pixels will not be altered.

The aim of the present invention is to provide a method and system that while avoiding transcoding of an already coded H.264/AVC stream would allow for generation of IDR frame(s) in that stream. A real life example would be to receive a H.264/AVC stream from a satellite signal source and generate IDR frame(s) in the received H.264/AVC stream in order to obtain a modified H.264/AVC stream so that the modified H.264/AVC stream may be directly fed to an iPad™ device or any other device imposing similar requirements regarding IDR frame(s).

The object of the invention is a method for generating an Instantaneous Decoding Refresh (IDR) picture slice in an H.264/AVC compliant video data stream, the method comprising the steps of: starting reception of the H.264/AVC compliant video data stream; finding in the H.264/AVC compliant video data stream an I-type picture and identifying it as a start picture; modifying and/or adding, in each slice header of the start picture, IDR specific syntax elements; removing, from each slice header of the start picture, non-IDR specific syntax elements; removing, from the H.264/AVC compliant video data stream, all reference and non-reference B slices between the start picture and the next I picture or P picture, following the start picture, that is either a frame or the first field, in decoding order, of a complementary field pair; starting from the first picture after the removed slices, for each slice header, received from the H.264/AVC compliant video data stream, executing the following steps: correcting frame_num parameter so that they are valid with reference to the previous picture; correcting references, found in the "Memory Management Control Operation" (MMCO) structure, as a function of the removed reference B pictures; correcting references, found in the "Reference picture list reordering" structure, as a function of the removed reference B pictures; restoring H.264/AVC slice encapsulation for each modified slice.

Preferably, the step of finding in the H.264/AVC compliant video data stream an I-type picture uses supplemental enhancement information (SEI) data and in particular recovery point SEI message semantics.

Preferably, the IDR specific syntax elements are frame_num value set to 0 and picture_order_count value set to 0;

Preferably, the IDR specific syntax elements are further no_output_of_prior_pics_flag, long_term_reference_flag.

Preferably, the non-IDR specific syntax elements include adaptive_ref_pic_marking.

Preferably, the step of correcting frame_num parameter so that they are valid with reference to the previous picture also includes correction of the picture_order_count parameter.

Preferably, correcting references, found in the "Memory Management Control Operation" structure, as a function of the removed reference B pictures includes verifying whether in the "Memory Management Control Operation" entries, differentially encoded target short-term reference picture indices do not refer to the removed B pictures preceding the start picture in the decoding order.

Preferably, MMCO correction is effected for the number of pictures specified by MaxFrameNum parameter.

Preferably, correcting references, found in the "Memory Management Control Operation" structure, as a function of the removed reference B pictures includes: verification if memory_management_control_operation equals 1 or if the parameter of memory_management_control_operation equals 3; when the foregoing requirement is true, checking, whether the referenced picture has a frame_num indicating a picture that precedes the next I or P picture following the start picture, in decoding order, that is either a frame or the first field of a complementary field pair; when the foregoing requirement is true, checking if the referenced picture is an IDR frame/picture or a field of a complementary pair that contains the processed IDR picture; when the foregoing requirement is true, correcting, the parameter of difference_of_pic_nums_minus1 such that: corrected_difference_of_pic_nums_minus1=difference_of_pic_nums_minus1−number_of_dropped_reference_frames<<field_shift, where the field_shift value equals field_pic_flag of the currently processed picture; else, removing the memory_management_control_operation from the processed picture.

Preferably, correcting references (209), found in the "Reference picture list reordering" structure, as a function of the removed reference B pictures is effected for the number of pictures specified by MaxFrameNum parameter.

Preferably, correcting references (209), found in the "Reference picture list reordering" structure, as a function of the removed reference B pictures includes correction of reference lists entries or their removal.

Preferably, restoring H.264/AVC slice encapsulation (210) for each modified slice includes encapsulation at RBSP, NAL and Annex-B byte stream levels.

The object of the invention is also a computer program comprising program code means for performing all the steps of the method according to the invention when said program is run on a computer.

The object of the invention is also a computer program comprising program code means for performing all the steps of the method according to the present invention when said program is run on a computer.

The object of the invention is also a computer readable medium storing computer-executable instructions performing all the steps of the computer-implemented method according to any of claims 1 to 9 when executed on a computer.

The object of the invention is also a system for generating an Instantaneous Decoding Refresh (IDR) picture slice in an H.264/AVC compliant video data stream, the system comprising a data receiving block for reception of the H.264/AVC compliant video data stream wherein an I-type picture conversion unit configured to: find in the H.264/AVC compliant video data stream an I-type picture and identifying it as a start picture; modify and/or add, in each slice header of the start picture, IDR specific syntax elements; remove, from each slice header of the start picture, non-IDR specific syntax elements; remove, from the H.264/AVC compliant video data stream, all reference and non-reference B slices between the start picture and the next I picture or P picture, following the start picture, that is either a frame or the first field, in decoding order, of a complementary field pair; The system further comprises a pictures conversion unit configured to, starting from the first picture after the removed slices, for each slice header, received from the H.264/AVC compliant video data stream, execute the following steps: correct frame_num parameter so that they are valid with reference to the previous picture; correct references, found in the "Memory Management Control Operation" (MMCO) structure, as a function of the removed reference B pictures; correct references, found in the "Reference picture list reordering" structure, as a function of the removed reference B pictures; restore H.264/AVC slice encapsulation for each modified slice; and comprises an output unit for outputting an H.264/AVC compliant video data stream comprising an Instantaneous Decoding Refresh (IDR) picture slice.

The method arrangement according to the invention allows for generation of IDR frame(s) in a H.264/AVC stream. The method has low requirements regarding system resources and at the same time can be utilized to replace time and resource consuming transcoding process used by prior art systems.

The object of the invention is shown, by means of exemplary embodiments, on a drawing, in which:

FIGS. 1 presents prior art of an exemplary sequence of H.264/AVC pictures involving hierarchical B pictures;

Figure 1:
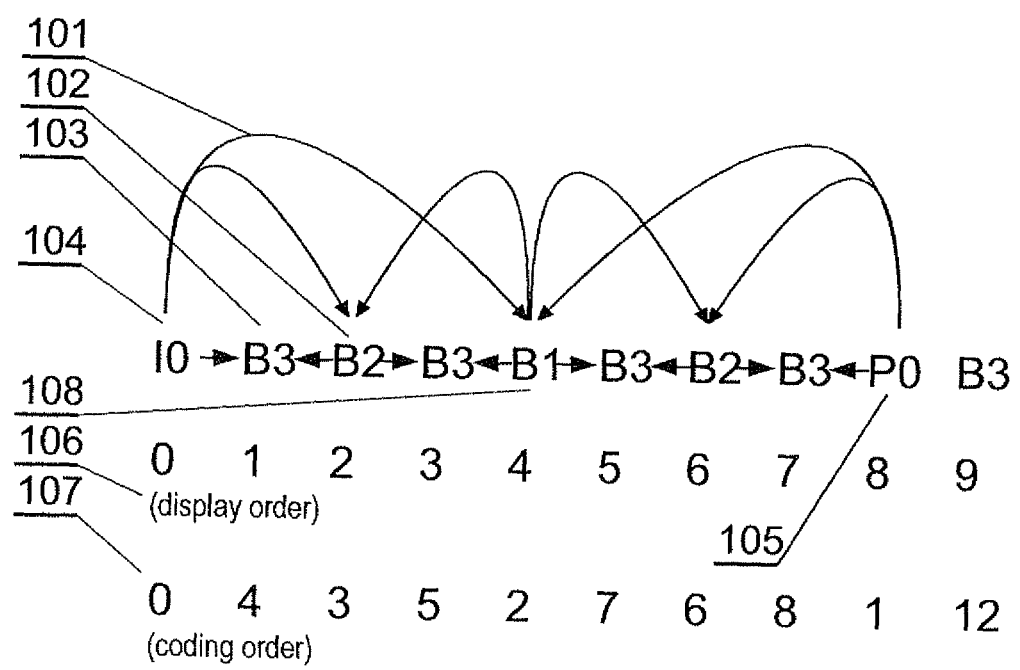
Figure 2:
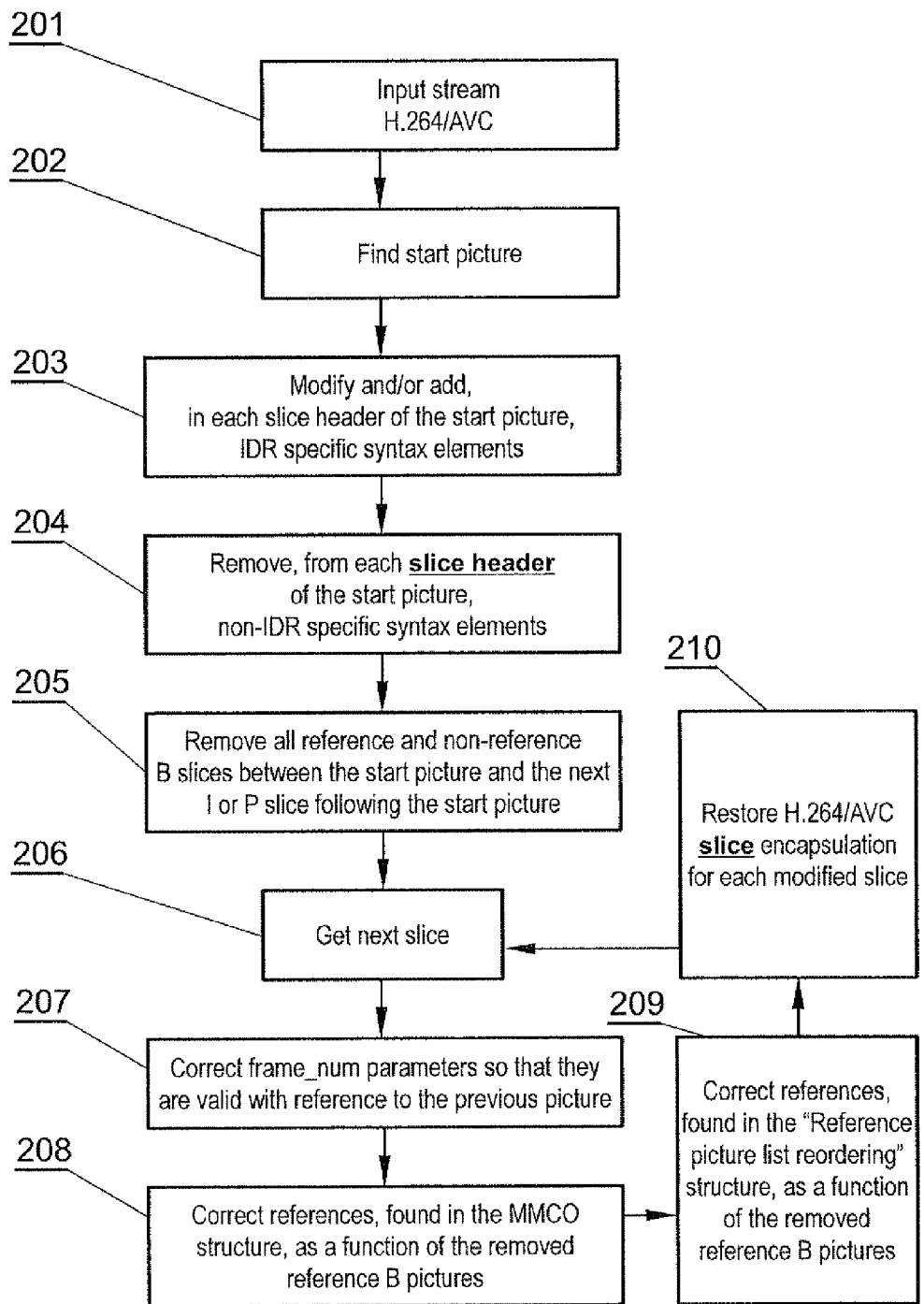
FIG. 2 shows an exemplary embodiment of the method according to the invention.
Figure 4:
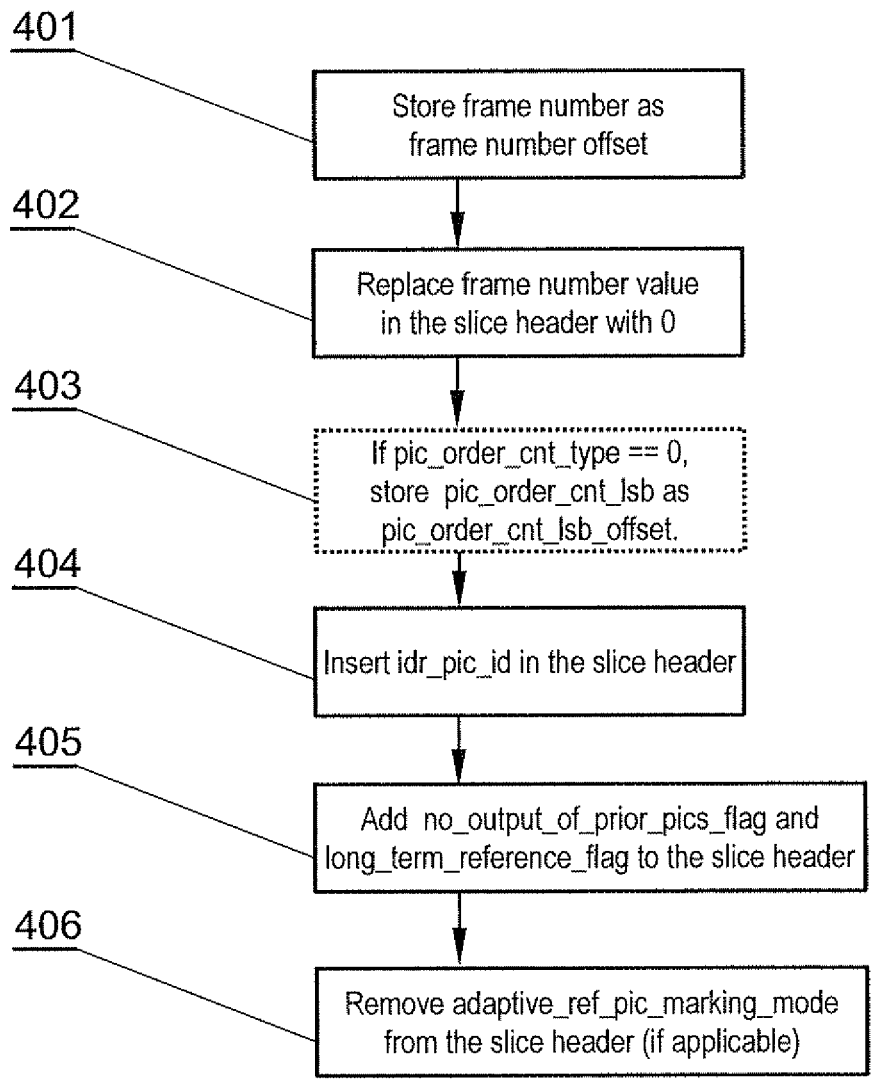
Figures 6, 7:
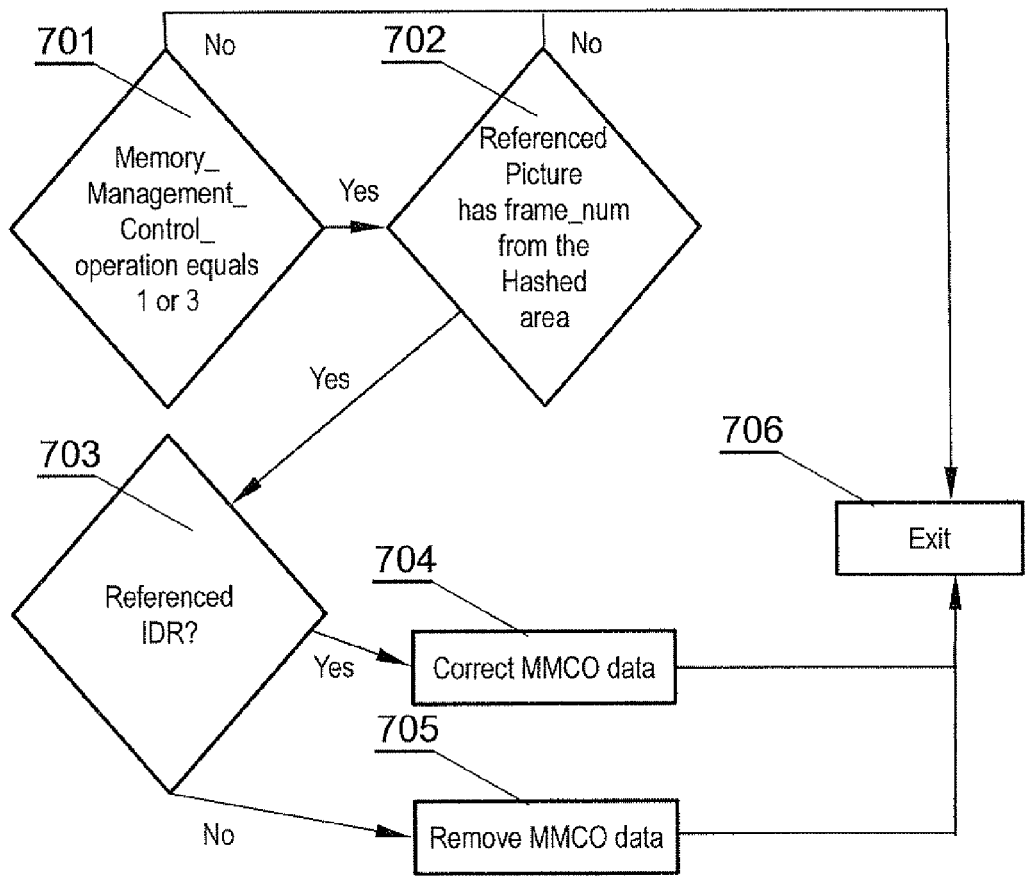
Figure 8:
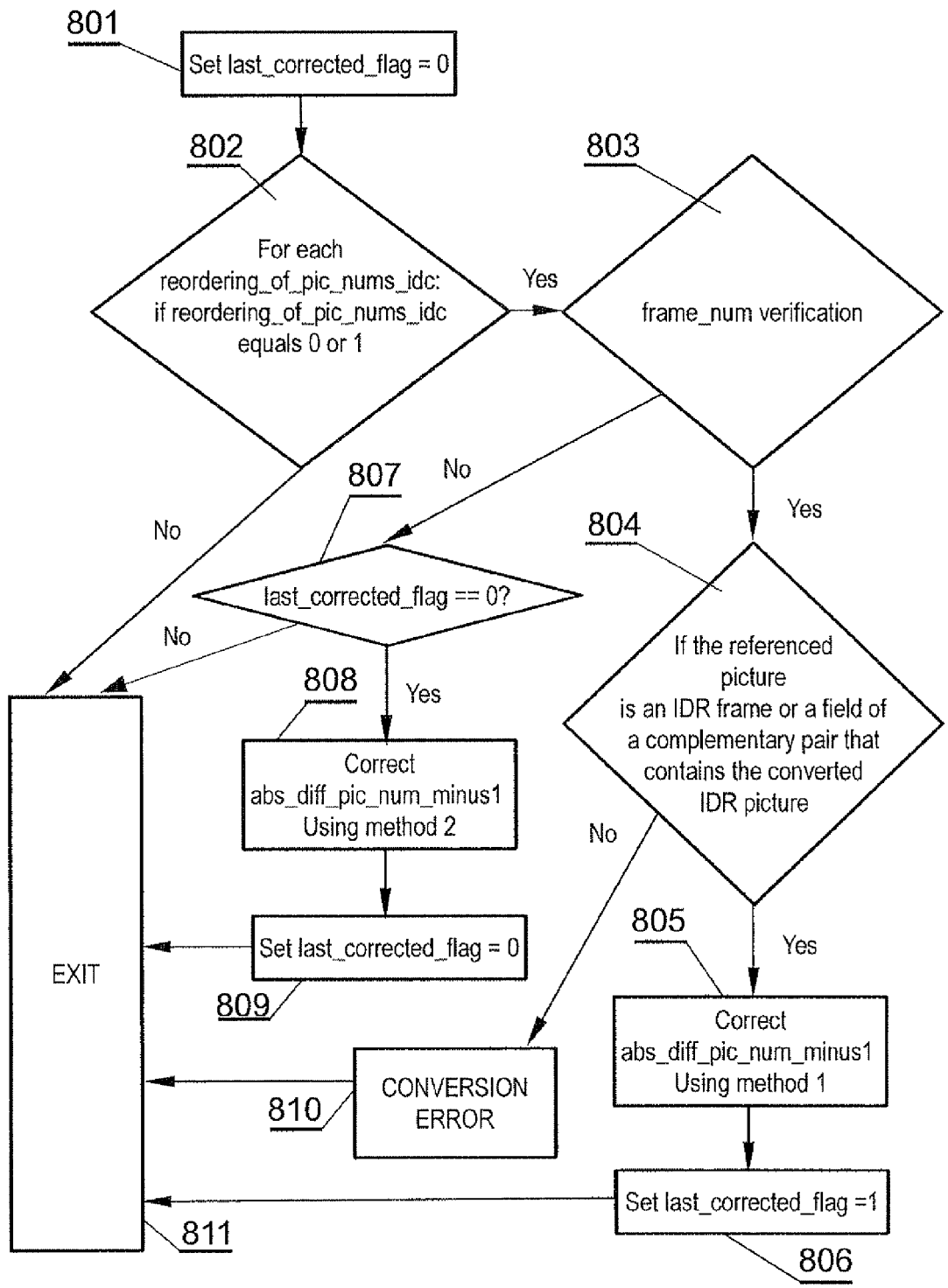
Figure 9:
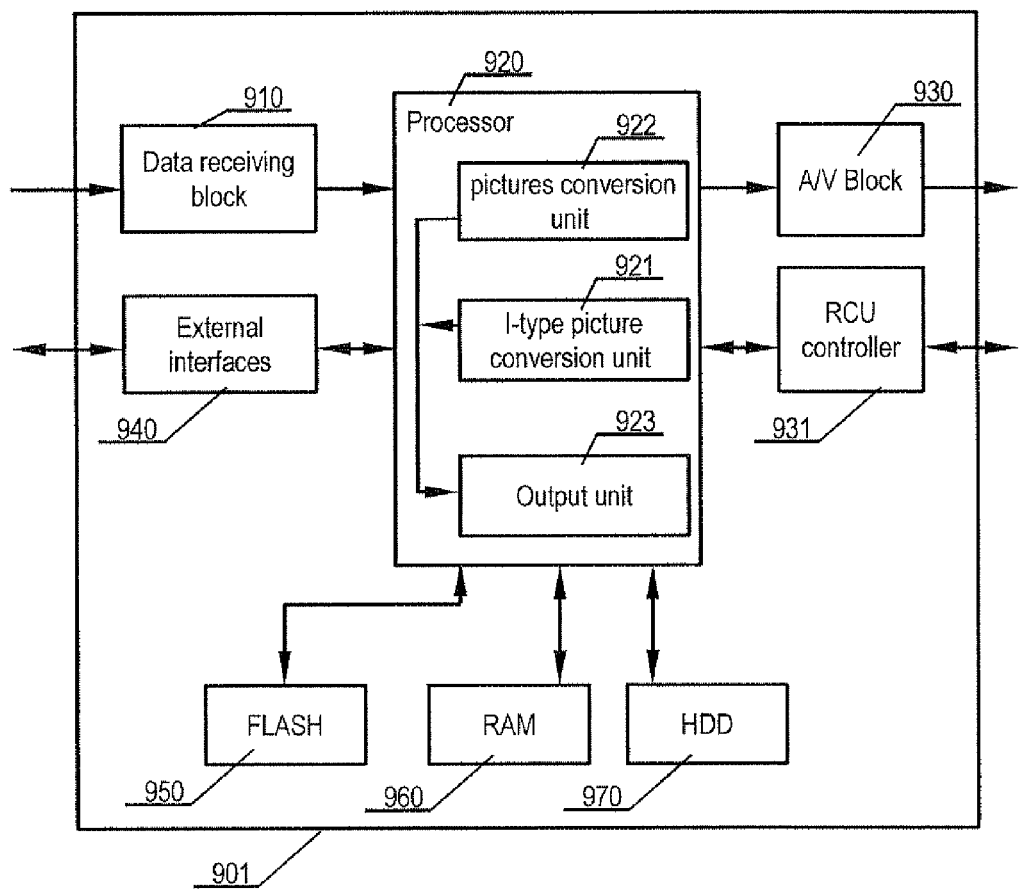

FIG. 4 presents actions of modifying and/or adding, in each slice header of the start picture, IDR specific syntax elements;

FIG. 5 presents an example of input and output pictures taking into account steps 201 to 205 of the method shown in FIG. 2;

FIG. 6 shows an overview of MMCO data updating over time;

FIG. 7 depicts MMCO correction algorithm;

FIG. 8 presents a method of correcting the "Reference picture list reordering" structure; and FIG. 9 is an overview of a system according to the present invention.

The following specification assumes several preferred general rules. An input stream is preferably processed access unit (AU) by access unit (sequence of AUs). Boundaries between successive access units are always under control during conversion. In particular, whenever picture dropping is discussed herein, an entire AU containing the picture will be dropped. Complete processed AUs are also the base units fed to Packetized Elementary Stream (PES) encapsulation layer.

Additionally, when there is no access unit delimiter present in an AU, it is inserted during the conversion. The delimiter is not mandatory for the present method and system, but it is required by some consumer devices such as iOS devices to decode a H.264 stream properly.

At any point of the generation process according to the present invention, should an IDR picture be identified in the input stream, conversion shall be aborted beginning from the AU that contains the IDR picture and the original stream shall be passed through to the converter output.

The method according to the invention has been shown in an exemplary embodiment in FIG. 2. The method starts from beginning of reception of an H.264/AVC compliant video data stream 201. Such reception is effected by means of a front-end block comprising for example a tuner, demodulator and demultiplexer in case for example of a not scrambled satellite H.264/AVC data stream.

Typically, when starting reception, the receiver will encounter a sequence of pictures similar to the following BBBIBBBPBBBP ( . . . ) and in a broadcast environment, presently used on the market, an IDR picture might never be received. The received data comprise, at different abstraction levels, so called start codes that allow for finding appropriate data structures within a stream.

H.264/AVC/MPEG-4 Part 10 contains a number of features that provide more flexibility for application to a wide variety of network environments. In particular, such features include Supplemental enhancement information (SEI) and video usability information (VUI), which are extra information that can be inserted into the bitstream to enhance the use of the video for a wide variety of purposes. An H.264/MPEG-4 AVC-compliant bitstream consists of a sequence of Network Abstract Layer Units (NAL Units). NAL Units are for example Sequence Parameter Set (SPS), Picture Parameter Set (PPS), Supplemental Enhancement Information (SEI), and slice. The SPS and PPS NAL Units contain information for the correct decoding of a sequence of pictures. A SEI NAL Unit contains information that is not needed by the core video data decoding process. Nevertheless the information can be regarded as embedded metadata and informs decoders about any special attributes of the compressed video. H.264/AVC Pictures consist of one or more slices. In turn, each H.264/AVC slice contains a slice header and slice data.

Figure 3:
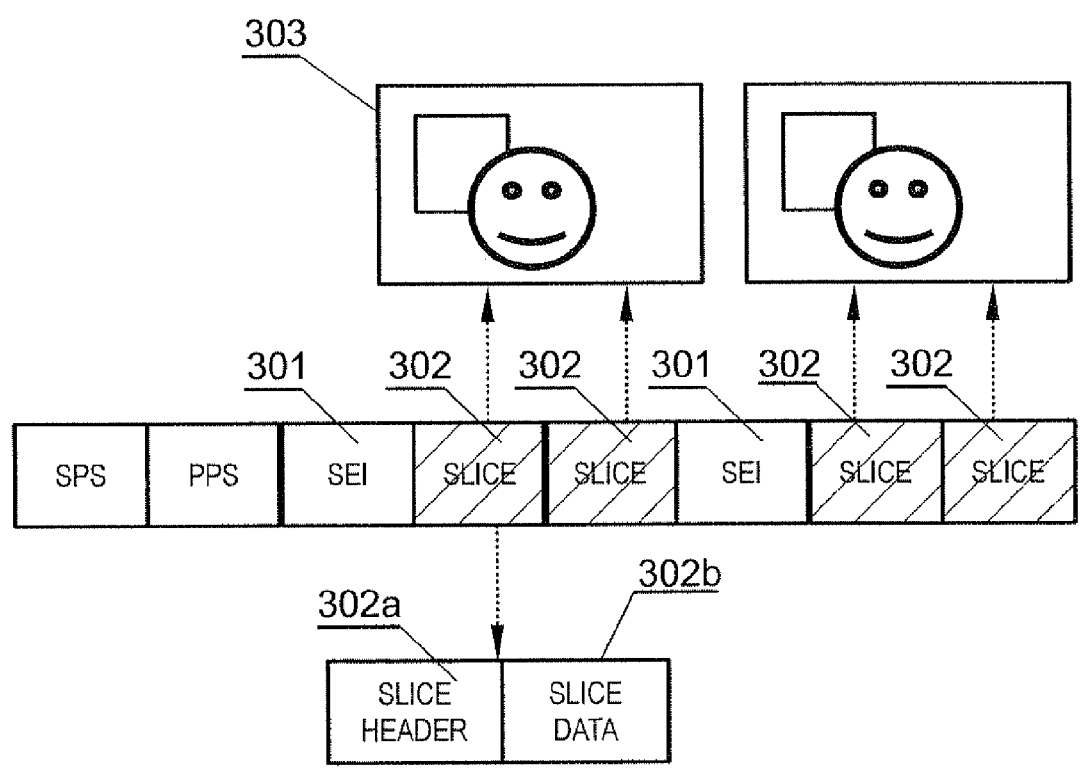
FIG. 3 depicts a typical NAL Units sequence.

FIG. 3 depicts a typical NAL Units sequence, wherein a SEI message 301 and slices 302 are identified, whereas a slice 302 consists of a slice header section 302a and slice data section 302b. The slice header 302a comprises identification and configuration information while slice data 302b comprises mainly encoded pixels data. It is to be carefully noted that a picture 303 may consist of one or more slices 302.

The start picture for the conversion engine is preferably identified 202 using recovery point SEI message semantics. The picture, indicated in the message, will be converted to an IDR picture, provided it is an I-type picture.

Alternatively, for example in the unlikely event that the stream does not contain SEI messages fulfilling the aforementioned requirements, a different start picture identification method may be used such as choosing the first I picture encountered.

Since all access units containing pictures preceding the start picture are not decodable, they are either ignored or dropped in this step.

Next, the process of FIG. 2 proceeds to step 203. In step 203 there are executed actions of modifying and/or adding, in each slice header of the start picture, IDR specific syntax elements. The process has been explained in details with reference to FIG. 4.

In particular frame_num parameter needs to be set to 0 (zero) 402. The parameter frame_num is decoded from each slice header 302a. Frame_num increases in decoding order of access units and does not necessarily indicate display order. If frame_num is greater than 0 then the method according to the present invention shall be applied.

The received frame_num value of start picture is stored as frame_num_offset 401. Further at step 403 optionally POC value may be stored. It is optional since most decoders will easily cope with these values unaltered. However in some cases modification of POC values may be advantageous. POC determines the display (output) order of decoded frames, starting from first field of an IDR picture (POC=0).

POC is derived from the slice header in one of 3 ways. If pic_order_cnt_type=0, there is stored pic_order_cnt_lsb value as pic_order_cnt_lsb_offset. Next, at step 404, there is inserted idr_pic_id in the slice header. The value of idr_pic_id equals 0. Further, at step 405, there are inserted no_output_of_prior_pics_flag and long_term_reference_flag to the slice header.

The parameter of no_output_of_prior_pics_flag defines whether after reception of the related IDR picture the decoder is to stop outputting prior pictures. Its value is irrelevant for the present method since the converted IDR picture (the start picture) is always the first picture in a stream. Nevertheless the parameter must be added as one of IDR slice syntax elements.

The parameter of long_term_reference_flag defines whether a picture comprising the presently processed slice is to be marked as long-term prediction. It is set to 0 because in order to assign 1 such setting shall come from MMCO (Memory Management Control Operation) data deleted from the processed slice. This however may not happen since the field difference_of_pic_nums_minus1 by its definition gives a difference greater than 0, which means that no MMCO can apply to the frame or field (depending on a value of the field_pic_flag syntax element) whose slice it is transmitted in.

In theory there may be identified a complementary field of the same frame (difference_of_pic_nums_minus1=0), however the standard defines that: ( . . . when decoding a field and a memory_management_control_operation command equal to 3 is present that assigns a longterm frame index to a field that is part of a short-term reference frame or part of a short-term complementary reference field pair, another memory_management_control_operation command to assign the same long-term frame index to the other field of the same frame or complementary reference field pair shall be present in the same decoded reference picture marking syntax structure . . . ).

Returning to FIG. 2, after completion of step 203 the process of FIG. 2 proceeds to step 204. In step 204 there are executed actions of removing, from each slice header of the start picture, non-IDR specific syntax elements. In particular the adaptive_ref_pic_marking_mode is removed (406 of FIG. 4) from the slice header along with the following MMCO elements in case the removed adaptive_ref_pic_marking_mode was equal to 1.

Returning to FIG. 2, after completion of step 204 the process of FIG. 2 proceeds to step 205. In step 205 there are removed, from the input H.264/AVC compliant video data stream, all reference and non-reference B slices between the start picture and the next I or P slice (also picture as the case may be), following the start picture, that is either a frame or the first field, in decoding order, of a complementary field pair. As already explained an entire AU containing the respective picture shall preferably be dropped from the input stream.

It is a property of H.264/AVC hierarchical B picture encoding scheme, that the B pictures that follow the start picture and precede the next I or P picture, precede the start picture in the display order. Therefore, they can be safely dropped without any visible impact for a viewer. Dropping of pictures is necessary, because the discussed B pictures will be corrupted due to lack of their reference pictures in the decoded picture buffer.

For this purpose a variable is defined, in memory or a hardware register is assigned, that will store the number of dropped reference frames: set number_of_dropped_reference_frames to 0. Then, for each B picture that follows the start picture and precedes the next I or P picture, there is a check made if the B picture is a reference picture that is: a frame or an unpaired field or the first field of a reference field pair. If the foregoing is true, the variable of number_of_dropped_reference_frames is incremented by 1, the variable of frame_num_offset is incremented by 1 and the B picture is safely dropped from the input stream.

Separately, the total number of dropped reference B pictures may be stored in addition to the frame_num_offset value. This would allow for example to restore the initial frame_num value of the start picture.

FIG. 5 presents an example of input and output pictures taking into account steps 201 to 205 of the method shown in FIG. 2, wherein successive pictures are received from a source stream 501. Each of the received pictures 501 (in fact each slice of each picture) has assigned a frame_num parameter 502. The B pictures identified in bold and underlined are reference B pictures. These have frame_num values between 35 and 39. In addition the B pictures identified in plain text are non-reference B pictures. These have frame_num values 40.

When the start picture is found this picture is assigned frame_num 0 and a value previously assigned to frame_num is preserved in a variable of frame_num_offset 504. Therefore, for the I picture, frame_num 505 is set to 0 and frame_num_offset 504 is set to 34. As previously explained, frame_num equal to 0 is mandatory for an IDR slice.

As previously described with reference to step 205 of the method shown in FIG. 2, a number of reference B pictures 503 will typically be removed from the input sequence of pictures 501. In case depicted in FIG. 5, B pictures having original frame_num ranging from 35 up to and including 40 are to be removed. As can be readily seen, the value of number_of_dropped_reference_frames 503 is 5 for input frame_num 39 and remains 5 for input frame_num 40 and subsequently. This is because the B pictures with frame_num equal to 40 are non-reference pictures. In the example shown, 5 reference B pictures are dropped from the H.264/AVC input stream and the value of number_of_dropped_reference_frames 503 shall remain at 5.

In the example, output frame_num 505 equals input frame_num 501 minus frame_num_offset 504. Further, regarding frame_num values, each Sequence Parameter Set header comprises encoded information on maximum allowed value for frame_num field. The parameter is called MaxFrameNum and in the examples presented herein, the value of the parameter is 512. In case subtraction of a value of frame_num_offset 504 from a value of input frame_num 501 and is lower than 0 (zero), MaxFrameNum should be added to the result, eg. [10–34] is below 0, therefore [−24+512] equals 488, which will be assigned to the output frame_num 505.

Since all B pictures between source frame_num 34 (I picture) and source frame_num 40 (P picture) are removed, the input frame_num 34 shall receive new frame_num 0 and input frame_num 40 shall receive new frame_num 1. Similarly POC (picture_order_count) parameter may be adjusted 506. Returning to FIG. 2, after completion of step 205 the process of FIG. 2 proceeds to step 206. In step 206 there is a next slice read from the source H.264/AVC compliant video data stream. The retrieved slice is the next I-picture or P-picture slice, following the start picture, that relates to a frame or the first field, in decoding order, of a complementary field pair. Starting from the first picture after the removed slices, for each slice header, received from the H.264/AVC compliant video data stream, there are executed the following steps 207, 208, 209 and 210 as shown in FIG. 2.

Step 207 of FIG. 2 refers to correcting frame_num parameters so that they are valid with reference to the previous picture. This has been presented with reference to FIG. 5 and item 505 where the P-type picture is assigned frame_num value of 1. The frame_num parameter is updated in each slice header. Also, as described with reference to FIG. 5, the picture_order_count parameter may be updated at this step in line with previously described process.

Subsequently, the process advances to step 208 of FIG. 2. At this stage, there are corrected references, found in the "Memory Management Control Operation" structure, as a function of the removed reference B pictures. Unless the size of the multi-picture buffer is set to one picture, the index at which the reference picture is located inside the multi-picture buffer has to be signaled.

The process for decoding involves selection of the pictures to be used as the reference pictures for motion compensation from a number of stored previously-decoded pictures. The decoder replicates the multi-picture buffer of the encoder according to the reference picture buffering type and memory management control operations (MMCO) specified in the input video bitstream. With respect to the current picture, already decoded pictures that precede or follow the current picture, in the display order are stored into the decoded picture buffer (DPB) and may be classified as either used for 'short-term' or 'long-term' reference pictures. Long-term reference pictures are introduced to extend the temporal motion compensation search range by explicitly delaying removal of a decoded picture from the DPB. Memory management is required to take care of marking stored pictures as used for long-term reference as well as marking both short-term and long-term reference pictures as 'unused for reference' in order to remove them from the buffer.

If there are MMCO commands present in the slice 206 header, it must be considered whether their differentially encoded (in respect to the current picture number) target short-term reference picture indices do not refer to the removed B pictures or pictures that are not in the buffer, due to random access scheme to the input bitstream. Moreover, any removed reference B picture will affect frame_num ordering. Hence encoding of the respective indices has to be corrected to reflect the updated values.

The MMCO correction window preferably spans over a period of time, in which all pictures that precede the first picture following the removed pictures, would remain marked as used for short-term reference, if they were decoded as a part of the unaltered stream. Additionally, all MMCOs with invalid references need to be removed from the second field of a complementary field pair that contains the converted IDR field, provided such pair exists. This case refers to a situation when the coding output was a stream using complementary pair fields instead of pictures constituting frames. For example such stream is typically organized as follows: I/P(frame_num=0) B/B(frame_num=1) b/b(frame_num=2) b/b(frame_num=2) P/P(frame_num=3). I/P are two images–two fields having the same value of frame_num–a complementary pair. During conversion of an I picture to an IDR picture such pair will become an IDR/P pair. This means that the P is before the B and may reference other pictures. If these references are invalid, they shall be removed. Any references to the IDR will be correct since there are no other pictures between P and IDR of the example.

As an example, shown in FIG. 6, consider a stream with MaxFrameNum =512, where the frame following the removed pictures yields frame_num=107 in the original bitstream. In the presented drawing, bolded numbers represent frame_num of the currently converted picture at a given time. The unfilled area indicates frames that will be present in the converted/output stream, excluding the converted IDR start picture (left out for figure simplicity), therefore are safe to be referenced. The hashed area indicates the range of frame_numbers that are not available for reference in the converted stream at a given time. MMCOs referencing these frame_numbers need to be corrected/removed from the output stream. It can be observed, that following a full frame_number wrap, it is guaranteed that all future pictures will have valid references.

For example at time 601 frame number 107 (each slice header comprising frame_num of 107) is converted. At this time, only the IDR picture may be referenced and no other picture is available.

Subsequently, at time 602, frame number 108 (each slice header) is converted. At this time, only the IDR picture and the 107 picture may be referenced and no other picture. In order to explain the details of the latter, let us assume at this point that the converted IDR picture yielded frame number of 105 (in the original bitstream) and two reference B pictures have been removed from the converted bistream preceding the output picture with the original frame number of 107. This means that at time 602, an MMCO referencing frame number 107 is left untouched, MMCO referencing frame number of the IDR picture is valid but needs to be corrected due to B-picture removal and finally MMCOs referencing any other pictures must be removed.

Thereafter, at time 603, the process advances to frame number 511. At this time all frames having frame_num of 0 or 107 to 510 are always safe to be referenced. The remaining frame_num range encompasses pictures that are not present in the output stream and thus cannot be referenced, except for the IDR picture that belongs also to this range and, obviously, is a valid reference, provided the aforementioned correction is done.

At this time, the system needs to wrap the counter of frame_num. This is evidenced at time 604 when frame_num of 50 is being processed. At this time, all frames having frame_num of 0-49 or 107 to 510 are safe to be referenced.

Finally, at time 605, frame_num 106 is being processed. At this time, all frames having frame_num of 0 to 511 may be referenced. This means that the process of MMCOs correction may be safely stopped.

MMCO correction algorithm is given with reference to FIG. 7. The system first verifies 701 if memory_management_control_operation equals 1 or if the parameter of memory_management_control_operation equals 3. When the foregoing requirement is true, the system checks, at step 702, whether the referenced picture has a frame_num from the hashed area of FIG. 6 (belonging to previously output pictures). Thereafter, if the referenced picture is an IDR frame/picture 703 or a field of a complementary pair that contains the converted IDR picture, there is corrected, at step 704, the parameter of difference_of_pic_nums_minus1 such that:

corrected_difference_of_pic_nums_minus1=
  difference_of_pic_nums_minus1–
  number_of_dropped_reference_frames<<field_shift where the field_shift value equals field_pic_flag of the currently converted picture. Else, at step 705, the system shall drop the memory_management_control_operation from the converted slice. The method is exits at step 706. Typically there are numerous MMCO entries in a slice header. Therefore, the process described above with reference to a single MMCO entry, has to be applied to all MMCO entries.

Returning to FIG. 2, after of step 208, the process of FIG. 2 proceeds to step 209. In step 209 there are corrected references, found in the "Reference picture list reordering" structure, as a function of the removed reference B pictures. 4. Similarly to MMCOs, if there are reference list reordering sections in the input H.264/AVC stream, the differentially encoded picture indices must be corrected in order to take account of the removed pictures. The correction window span rules are similar to the ones given above (reference to MMCOs) with one highly preferred addition discussed below.

Referring to FIG. 8, the method of correcting the "Reference picture list reordering" structure is shown in details. In H.264/AVC streams, reference pictures are ordered in one or two lists prior to encoding or decoding a slice. P slices use a single list of reference pictures, list0; B slices use 2 lists, list0 and list1. In each list, short term reference pictures are listed first followed by long term reference pictures. The default short term reference picture order depends on decoding order when the current slice is a P slice and depends on display order when the current slice is a B slice.

The method starts from step 801, where the system sets last_corrected_flag =0. This flag indicates that a correction has been applied to a preceding IDR picture index when its value is set to 1. Then, the method moves to step 802, where a check is made for each reordering_of_pic_nums_idc (in the standard version updated in 2010, the naming was changed to modification_of_pic_nums_idc/reference picture list modification syntax) comprising the reference picture list reordering syntax whether the reordering_of_pic_nums_idc equals 0 or reordering_of_pic_nums_idc equals 1. When the verification of step 802 is positive, the method moves to step 803, where it is verified whether the referenced picture has frame_num from the hashed area of FIG. 6.

Further, when the verification of step 803 is positive, the method moves to step 804, where it is verifies whether the referenced picture is an IDR frame or a field of a complementary pair that contains the converted IDR picture.

In case the verification of step 804 is true, the method of FIG. 8 advances to step 805, whereas in the opposite case the method advances to step 810.

At step 805, the referenced picture is an IDR frame or a field of a complementary pair that contains the converted IDR picture. In such case, there is corrected the parameter of abs_diff_pic_num_minus1 such that corrected_abs_diff_pic_num_minus1=abs_diff_pic_num_minus1−number_of_dropped_reference_frames<<field_shift, where the field_shift equals field_pic_flag of the currently converted picture. Subsequently, the method moves to step 806 where the value of last_corrected_flag is set to 1.

When step 810 is reached, it indicates that there exist unexpected references to frame numbers from the hashed area. The referenced pictures are not present in the output stream, hence the latter will not decode properly. It is up to a specific implementation of this method how to react to this condition. Amongst possible actions there are, for example, ignoring the problem, aborting the conversion or signalling an error to a high level module.

At step 808 there is corrected the parameter of abs_diff_pic_num_minus1 such that corrected_abs_diff_pic_num_minus1=abs_diff_pic_num_minus1−number_of_dropped_reference_frames<<field_shift, where the field_shift equals field_pic_flag of the currently converted picture. Subsequently, the method moves to step 809 where the value of last_corrected_flag is set to 0.

Provided step 810 has not been reached before, the method of FIG. 8 ends at step 811.

Returning to FIG. 2, after completion of step 209 the process of FIG. 2 proceeds to step 210. In step 210, there is restored H.264/AVC slice encapsulation for each modified slice. For each modified slice the system preferably copies remaining bits of the original slice following the last modified bit up to and including the rbsp_stop_one_bit. Further the method aligns with zeros to a byte boundary and inserts the original number of cabac_zero_words (if CABAC binary encoder is used) and trailing_zeros (these numbers can be obtained for example during original NAL extraction from the source H.264/AVC bitstream).

Further, preferably NALUs are additionally processed at the RBSP (Raw byte sequence payload—byte level) stream. Specifically, due to an altered bit level layout, a processed slice NALUs shall preferably have their emulation prevention bytes reinserted, following removal of the original emulation prevention bytes, at predetermined valid positions. The use of emulation prevention bytes guarantees that start code prefixes are unique identifiers of the start of a new NAL unit.

The preferred method of encapsulation restoration shall be done at RBSP, NAL and Annex-B byte stream levels. Annex B of the specification defines one such format, which wraps NAL units in a format resembling a traditional MPEG video elementary stream, thus making it suitable for use with containers like MPEG PS/TS unable to provide the required framing. Restoration of encapsulation at the RBSP level involves, preferably, insertion of the original number of trailing zero and zero bytes into the output stream.

FIG. 9 is an overview of a system according to the present invention. The decoder of digital television 901, for which the solution according to the presented technical concept may be applied, is divided into many functional modules, while its simplified version was shown in FIG. 9, as mentioned above, to avoid an overly complicated block diagram. It should be noted however, that the method may be applied in any device capable of H.264/AVC television or audio/video content data reception and output of such data to an external device, such as a smartphone or a tablet computer.

The most important module of the decoder 901 is a processor 920, which comprises three modules.

An I-type picture conversion unit (921) is configured to: (a) find in the H.264/AVC compliant video data stream an I-type picture and identifying it as a start picture; (b) modify and/or add, in each slice header of the start picture, IDR specific syntax elements; (c) remove, from each slice header of the start picture, non-IDR specific syntax elements; and (d) remove, from the H.264/AVC compliant video data stream, all reference and non-reference B slices between the start picture and the next I or P slice, following the start picture, that relates to a frame or the first field, in decoding order, of a complementary field pair.

A pictures conversion unit (922) is configured to, starting from the first picture after the removed slices, for each slice header (206), received from the H.264/AVC compliant video data stream, execute the following steps: (e) correct frame_num parameter (207) so that they are valid with reference to the previous picture; (f) correct references (208), found in the "Memory Management Control Operation" (MMCO) structure, as a function of the removed reference B pictures; (g) correct references (209), found in the "Reference picture list reordering" structure, as a function of the removed reference B pictures; and (h) restore H.264/AVC slice encapsulation (210) for each modified slice.

An output unit (923) is configured for outputting an H.264/AVC compliant video data stream comprising an Instantaneous Decoding Refresh (IDR) picture slice.

In another example of embodiment, the blocks 921, 922 and 923 can be separate modules placed outside the processor.

There is signal from data reception block 910, in the decoder 901, connected to the processor 920. Such data may comprise a H.264/AVC television data stream received from a head-end facility (not shown). Some of the applications run on the decoder may be downloaded from the source signal received by the data reception block 910. Such applications may include software configured and used for generating an Instantaneous Decoding Refresh (IDR) picture slice in an H.264/AVC compliant video data stream, according to the presented concept. Other data may include content downloaded from the Internet or a local computer network. A head-end may provide content by means of for example a cable, satellite, terrestrial or Internet protocol data communication link.

The block A/V 930 and the remote control unit block 931 allow to transmit the output A/V signal to a display and communicate with external control devices, for example a remote control unit, a smartphone or a tablet computer.

Additionally the processor has a possibility of bi-directional exchange of data through external interfaces 940. Such interfaces are for example wireless network connections, external memories, home networking communication links.

The digital television decoder 901 comprises also several types of memory, which are bi-directionally connected to the processor 920. These are the non-volatile memory (for example, of FLASH type 950) and operational RAM memory 960. There are programs, for controlling the operation of the digital television decoder 901, stored in these memories. The Hard Disk memory 970 is typically is utilized as a storage space for viewer's data.

One or more programmed software applications, herein referred to as applications, are executed by utilizing the computing resources in the decoder 901. Applications, stored in flash memory 950 or RAM 960 memory, are executed by the processor 920. Data sometimes, required as input by an application is stored in HDD 970, RAM 960 or flash memory 950 and read by processor 920 as needed during the course of the application's execution. An application implementing the method according to the present invention may also resident in decoder's memories.

The methods and systems as described above can be implemented in a computer system, and performed or controlled by one or more computer programs. Such computer programs are typically executed by utilizing the computing resources of a processing unit which can be embedded within various video signal receivers, such as personal computers, personal digital assistants, cellular telephones, receivers and decoders of digital television, video display units or the like. The computer programs can be stored in a non-volatile memory, for example a flash memory or in a volatile memory, for example RAM and are executed by the processing unit. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation, in the foregoing specification, do not imply any limitation on the invention whatsoever. It will, however, be evident that various modifications and changes may be made thereto without departing from the broader scope of the presented technical concept. The presented preferred embodiments are exemplary only, and are not exhaustive of the scope of the technical concept presented herein. Accordingly, the scope of protection is not limited to the preferred embodiments described in the specification, but is only limited by the claims that follow.

The invention claimed is:

1. Method for generating an Instantaneous Decoding Refresh (IDR) picture slice in an H.264/AVC compliant video data stream, the method comprising the steps of:
   Starting reception of the H.264/AVC compliant video data stream (201) by a data receiving block;
   with a conversion unit Finding in the H.264/AVC compliant video data stream an I-type picture and identifying it as a start picture (202);
   Modifying and/or adding (203), in each slice header of the start picture, IDR specific syntax elements;
   Removing (204), from each slice header of the start picture, non-IDR specific syntax elements;
   Removing (205), from the H.264/AVC compliant video data stream, all reference and non-reference B slices between the start picture and the next I picture or P picture, following the start picture, that is either a frame or the first field, in decoding order, of a complementary field pair;
   Starting from the first picture after the start picture, for each slice header (206), received from the H.264/AVC compliant video data stream, executing the following steps:
   Correcting frame_num parameters (207) so that they are valid with respect to the previous picture;
   Correcting picture references (208), found in the "Memory Management Control Operation" (MMCO) structure, as a function of the removed reference B pictures;
   Correcting picture references (209), found in the "Reference picture list reordering" structure, as a function of the removed reference B pictures;
   Restoring H.264/AVC slice encapsulation (210) for each modified slice; and
   with an output unit, outputting an H.264/AVC compliant video data stream comprising an Instantaneous Decoding Refresh (IDR) picture slice.

2. The method according to claim 1 characterised in that the step of finding in the H.264/AVC compliant video data stream an I-type picture uses supplemental enhancement information (SEI) data and in particular recovery point SEI message semantics.

3. The method according to claim 1 characterised in that the IDR specific syntax elements are frame_num value set to 0 and picture_order_count value set to 0.

4. The method according to claim 3 characterised in that the IDR specific syntax elements are further no_output_of_prior_pics_flag, long_term_reference_flag.

5. The method according to claim 1 characterised in that the non-IDR specific syntax elements include adaptive_ref_pic_marking.

6. The method according to claim 1 characterised in that the step of correcting frame_num parameters so that they are valid with respect to the previous picture also includes correction of the picture_order_count parameter.

7. The method according to claim 1 characterised in that correcting picture references, found in the "Memory Management Control Operation" structure, as a function of the removed reference B pictures includes verifying whether in the "Memory Management Control Operation" entries, differentially encoded target short-term reference picture indices do not refer to the removed B pictures or pictures preceding the start picture in the decoding order.

8. The method according to claim 1 characterised in that MMCO correction is effected for the number of pictures specified by MaxFrameNum parameter.

9. The method according to claim 1 characterised in that correcting picture references, found in the "Memory Management Control Operation" loop, as a function of the removed reference B pictures includes:
   verification (701) if memory_management_control_operation equals 1 or if the parameter of memory_management_control_operation equals 3;
   when the foregoing requirement is true, checking (702), whether the referenced picture has a frame_num indicating a picture that precedes the next I or P picture following the start picture, in decoding order, that is either a frame or the first field of a complementary field pair;

when the foregoing requirement is true, checking (703) if the referenced picture is an IDR frame/picture 703 or a field of a complementary pair that contains the processed IDR picture;

when the foregoing requirement is true, correcting (705), the parameter of difference_of_pic_nums_minus1 such that:

corrected_difference_of_pic_nums_minus1=
difference_of_pic_nums_minus1−
number_of_dropped_reference_frames<<field_shift, where the field_shift value equals field_pic_flag of the currently processed picture;

else (705), removing the memory_management_control_operation from the processed picture.

10. The method according to claim 1 characterised in that correcting picture references (209), found in the "Reference picture list reordering" structure, as a function of the removed reference B pictures is effected for the number of pictures specified by MaxFrameNum parameter.

11. The method according to claim 1 characterised in that correcting picture references (209), found in the "Reference picture list reordering" structure, as a function of the removed reference B pictures includes correction of reference lists entries or their removal.

12. The method according to claim 1 characterised in that restoring H.264/AVC slice encapsulation (210) for each modified slice includes encapsulation at RBSP, NAL and Annex-B byte stream levels.

13. A non-transitory computer readable non-volatile memory storing computer-executable instructions performing all the steps of the computer-implemented method according to claim 1 when executed on a computer.

14. A system (901) for generating an Instantaneous Decoding Refresh (IDR) picture slice in an H.264/AVC compliant video data stream, the system comprising:

a data receiving block (910) for reception of the H.264/AVC compliant video data stream;

the system being characterized in that it further comprises:

an I-type picture conversion unit (921) configured to:

find in the H.264/AVC compliant video data stream an I-type picture and identifying it as a start picture;

modify and/or add, in each slice header of the start picture, IDR specific syntax elements;

remove, from each slice header of the start picture, non-IDR specific syntax elements;

a remove, from the H.264/AVC compliant video data stream, all reference and non-reference B slices between the start picture and the next I picture or P picture, following the start picture, that is either a frame or the first field, in decoding order, of a complementary field pair;

a pictures conversion unit (922) configured to, starting from the first picture after the removed slices, for each slice header, received from the H.264/AVC compliant video data stream, execute the following steps:

correct frame_num parameter so that they are valid with respect to the previous picture;

correct picture references, found in the "Memory Management Control Operation" (MMCO) structure, as a function of the removed reference B pictures;

correct picture references, found in the "Reference picture list reordering" structure, as a function of the removed reference B pictures;

restore H.264/AVC slice encapsulation for each modified slice; and an output unit (923) for outputting an H.264/AVC compliant video data stream comprising an Instantaneous Decoding Refresh (IDR) picture slice.

* * * * *